March 14, 1961  C. W. ANDERSEN  2,974,555
ELECTRONIC PIANO Filed March 18, 1955  8 Sheets-Sheet 1

INVENTOR.
Clifford W. Andersen
By: Olson & Trexler
attys

March 14, 1961 C. W. ANDERSEN 2,974,555
ELECTRONIC PIANO
Filed March 18, 1955 8 Sheets-Sheet 4

INVENTOR.
Clifford W. Andersen
BY
Olson & Trexler
att'ys

March 14, 1961 C. W. ANDERSEN 2,974,555
ELECTRONIC PIANO
Filed March 18, 1955 8 Sheets-Sheet 8

Fig. 25.

INVENTOR.
Clifford W. Andersen
BY:
Olson & Trexler
attys.

United States Patent Office 2,974,555
Patented Mar. 14, 1961

2,974,555
ELECTRONIC PIANO
Clifford W. Andersen, De Kalb, Ill., assignor to The Rudolph Wurlitzer Company, North Tonawanda, N.Y., a corporation of Ohio
Filed Mar. 18, 1955, Ser. No. 495,113
6 Claims. (Cl. 84—1.14)

This invention is concerned with the musical arts, and more particularly with an electronic piano.

The pianoforte, or piano, as it is commonly termed, has come to be the most popular and useful solo instrument, and is probably the most widely played of all instruments. For concert use the large size and weight of a piano are no doubt valuable assets in creating an impression on the audience. However, the size and weight of conventional pianos make them very difficult to move around. In residences it generally limits the use of pianos to first floor locations, and to the largest room in the house. This can be extremely undesirable from the standpoint of the student or casual pianist, and from the standpoint of other persons occupying the same residence.

Accordingly, it has been proposed that an electronic piano be provided materially reducing the size and weight, and rendering such piano readily portable and useable in substantially any location. It is known that a tuned reed having an electrical potential applied to it and vibrated near a conductive member will form with that member a variable capacity giving rise to an electrical oscillation which can be translated into a musical tone. I have found that when such a reed is percussively actuated, remarkably realistic piano tones can be produced if the various elements of the electronic piano are properly correlated, and the electrical oscillations generated are properly amplified and converted into audio oscillations. This invention is concerned with an electronic piano of this type.

It is an object of this invention to provide an improved and simplified piano action having particular applicability to an electronic piano.

It is a further object of this invention to provide an electronic piano vibrating reed and pick-up which are easy to fabricate and wherein a proper balance of fundamental and harmonics is obtained.

Another object of this invention is to provide, in an electronic piano, a pick-up capacitively associated with a vibrating reed wherein the pick-up is of sheet metal construction and is properly shaped to obtain a proper balance between fundamental and harmonics.

It is a further object of this invention to provide an improved case or housing for an electronic piano materially facilitating assembly of the parts of the piano.

It is another object of this invention to provide reed-supporting structure with a broad resonance to avoid deadening the tone of any of the tone-generating vibrating reeds.

A further object of this invention is to provide a vibrating reed electronic piano wherein the reeds are treated to render them corrosion resistant, thereby avoiding changes in vibrating characteristics with time.

It is a further object of this invention to provide a portable and detachable pedal structure for use with an electronic piano to retract the damping mechanism for playing forte.

Another object of this invention is to provide an electronic piano having an amplifier wherein the bass tones are diminished to avoid undesirable musical effects.

It is also an object of this invention to provide an electronic piano with a vibrato effect to simulate a vibraharp.

Other objects and advantages of the present invention will be apparent from the following description when taken in connection with the accompanying drawings wherein.

Referring now in greater particularity to the drawings, and first to Figs. 1–7 there will be seen an electronic piano generally identified by the numeral 30. The piano 30 includes a case 32 which is molded of plywood. In one preferred form of the invention the top 34, back 36, and bottom 38 are molded of an integral sheet of waterproof plywood. The ends 40 of the case are set into the top, back and bottom as most readily can be seen in Fig. 6 and the ends are suitably secured in position by means such as nails and glue. The case further includes a keyslip 42 which is of angular construction and is secured in place by means of a plurality of screws 44 extending up through the horizontal flange of the keyslip and received in structure hereinafter to be described.

Figure 1:
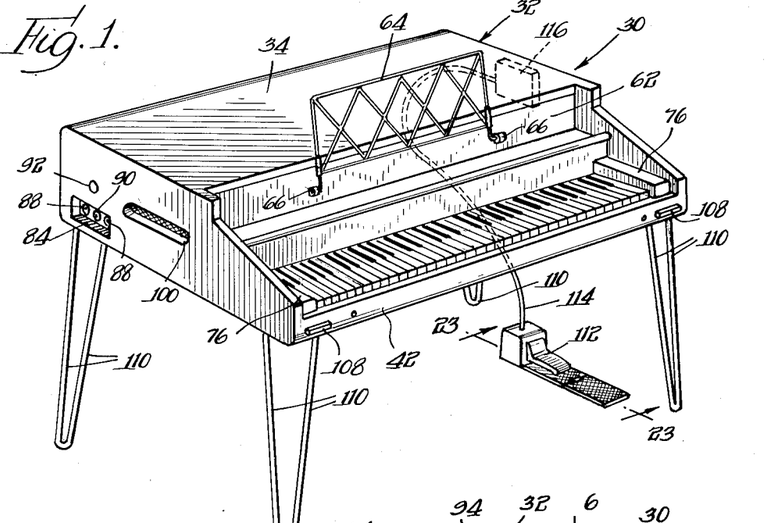
Fig. 1 is a perspective view of an electronic piano constructed in accordance with the principles of the invention.
Figure 2:
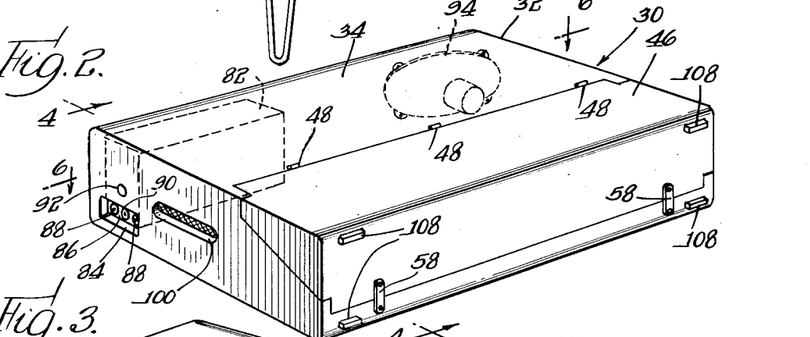
Fig. 2 is a perspective view of the piano when in closed position for carrying.
Figure 3:
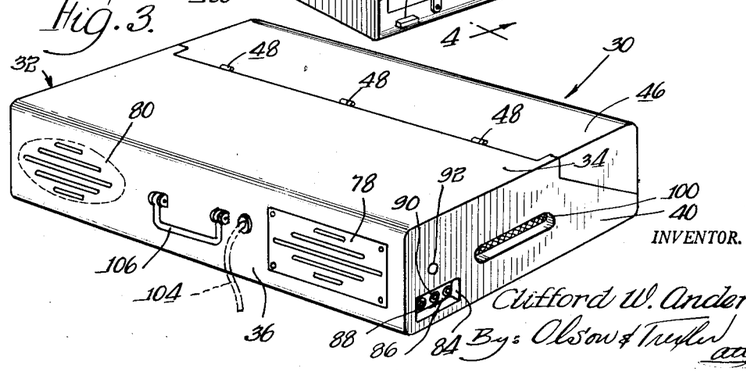
Fig. 3 is a rear perspective view of the piano when closed for carrying.
Figure 4:
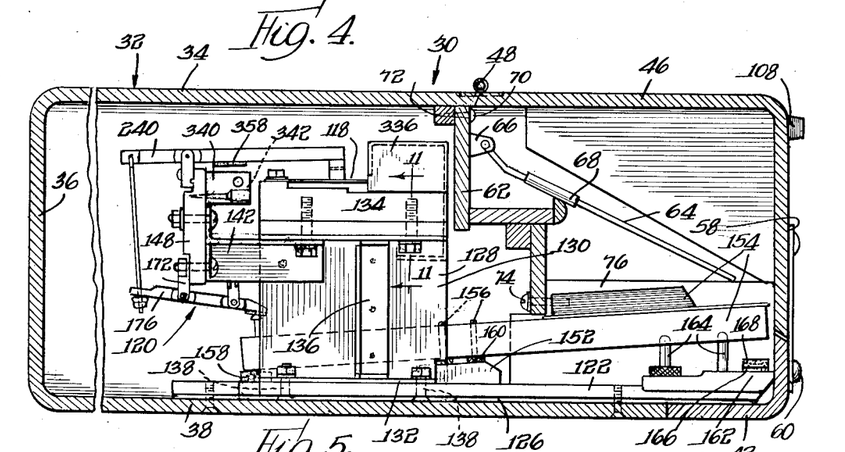
Fig. 4 is a vertical cross sectional view through the piano as taken substantially along the line 4—4 in Fig. 2.
Figure 5:
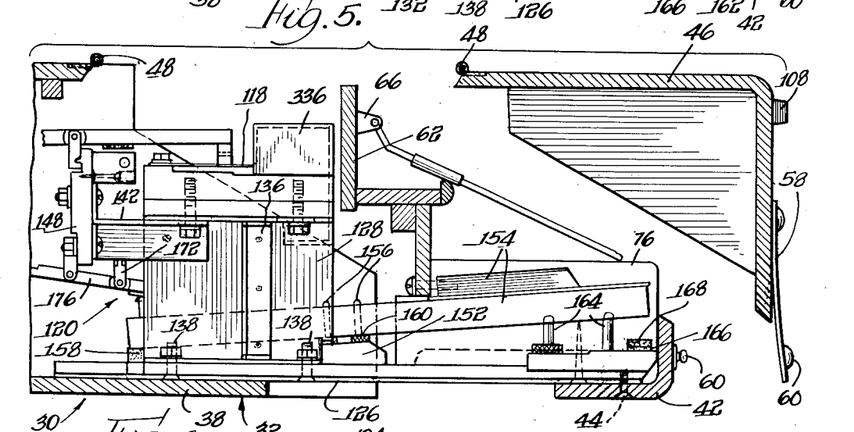
Fig. 5 is a view similar to Fig. 4 showing certain parts thereof on an enlarged scale and with the cover removed.
Figures 6, 7:
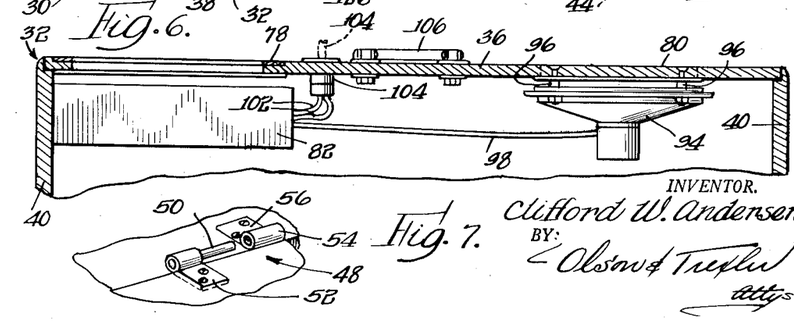
Fig. 6 is a fragmentary horizontal sectional view taken substantially along the line 6—6 in Fig. 2.
Fig. 7 is a fragmentary perspective view of one of the hinge members mounting the cover on the case.

The case is open at the top and front as may be seen in Fig. 1 and a cover 46 is provided to complete this portion of the case. The cover is secured along its rear edge by means of hinges 48 of the separable type. The hinges 48 as may be seen in Fig. 7 are of the separable type wherein the pin 50 is permanently received in one of the hinge leaves 52, and is detachably received in a tubular portion 54 of the second hinge leaf 56. Thus, when the cover is pivotally raised from the closed position shown in Figs. 2–4, it can be moved laterally of the case for complete removal. The cover is held in lowered position by any suitable means such as flexible straps 58 secured to the cover and detachably associated by means of snap-fastening means 60 with the front of the keyslip. The case also is provided with a music desk assembly 62. A wire music rack 64 is pivotally connected at its opposite ends to the vertical wall of the music desk assembly as at 66 and is pivotable between the upright position shown in Fig. 1 and the lowered carrying position shown in Figs. 4 and 5. The vertical side members of the rack 64 are provided with bumpers 68 which may be made of rubber or the like to prevent marring the contacting portions of the case. The music desk assembly is held in place by means of screws 70 (Fig. 4) passing through the top vertical wall thereof into a cleat 72 on the underside of the top 34, and by screws or bolts 74 passing through the lower vertical wall into blocks 76 at the opposite ends of the keyboard.

The entire case is spray-painted with a lacquer or plastic material providing an attractive and practically marproof finish.

The case is provided in the rear wall 36 with an access panel 78 (Figs. 3 and 6) removably held in place by means such as screws. The access panel conveniently is provided with horizontal slots for matching a loudspeaker louver 80 at the opposite end of the back 36, and also for allowing heat to escape from the amplifier unit 82 mounted within the case immediately behind the access panel 78. A recess 84 is provided in the left end 40 of the case and a panel 86 on the end of the amplifier is accessible through this recess and carries a pair of jacks 88 and a volume control knob 90. The volume control knob is connected also to an on-off switch in the amplifier. It will be apparent that the amplifier readily can be removed as a unit without the necessity of disconnecting any remotely positioned controls inasmuch as the jacks 88 and volume control knob 90 are mounted directly on the amplifier. An additional jack 92 is provided in the end 40 immediately above the recess 88 so that a phonograph may be plugged into the amplifier for playing concurrently with the piano. Such a phonograph preferably would have a separate volume control so as to allow a proper balance to be attained between the phonograph or record player and the electronic piano. The jacks 88 as will be explained hereinafter with regard to the circuit diagram are provided for attachment of a separate loudspeaker or for earphones.

A loudspeaker louver 80 as previously has been noted is provided in the rear 36 of the case and comprises a plurality of horizontal slots. A loudspeaker 94, conveniently of oval construction, is mounted behind this louver and is spaced therefrom by means of spacers 96. These spacers are of rubber or other resilient material and tend to prevent transmission of vibrations from the speaker to the case which might result in acoustical feedback. Furthermore, this spacing of the speaker from the case provides a desirable porting arrangement which helps to render the tones more realistic. The loudspeaker is connected to the amplifier by means of a cable 98 and a conventional plug on the cable detachably connects with a jack or receptacle carried by the amplifier unit 82. The ends 40 of the case are provided with horizontal slots 100 preferably having grille cloth behind them. The slots 100 serve the dual purpose of providing convenient handholds for lifting the instrument, and of helping to control the back loading of the loudspeaker 94.

Power wires 102 (Fig. 6) lead from the amplifier unit 82 to a separable connector 104 on the back of the case to allow ready removal of the amplifier, and a conventional flexible wire indicated at 104 removably leads from this connector to a conventional plug for insertion in a wall receptacle or the like. The case further is provided on the rear wall with a hingedly mounted handle 106 of the suitcase variety, and feet 108 are provided on the keyslip and on the cover for supporting the piano in vertical position when it is being transported.

The piano case can be supported on a desk or table, or legs can be attached temporarily to the case for supporting the same. In Fig. 1 the case is shown as detachably provided with the hairpin shaped wrought iron legs 110 which currently are popular in furniture. These legs can be secured to the bottom of the case by any suitable means such as screws. A foot pedal structure 112 also may be provided for connection by means of a Bowden cable 114 and a box-like connector 116 to the piano for operating the damper release mechanism to play forte. The pedal structure and associated parts are optional, and will be described in detail at a later time.

The piano forming the subject matter of this invention is provided with a plurality of vibratile reeds 118 as tone generators. Each of the reeds vibrates at a different frequency, as will be understood, and the specific configuration of the reeds as well as the mounting thereof will be described hereinafter. The reeds are percussively actuated by means of a plurality of piano actions 120, there being one such action for each reed. All of the piano actions are mounted on a vase or bed 122 comprising a wood board mounted within the case 32 on the bottom 38 thereof. The board is detachably held in place by a plurality of counter-sunk bolts extending through the bottom 38 and into T-nuts mounted in the bed 122. The bed is recessed as at 124 (Fig. 11) at its opposite ends for receipt of a steel plate 126. The bottom surfaces of these steel plates are flush with the bottom surface of the bed 122. The heads of various bolts or screws, some of which will be described hereinafter, are counter-sunk into the steel plates to present a flush under-surface, while the steel plates prevent the bolt-heads from tearing into the wood bed.

At each end of the bed there is provided a channel shaped supporting bracket formed of heavy gauge sheet metal. Each bracket is identified by the numeral 128 and comprises a wall or web 130, a lower horizontal flange 132, and an upper horizontal flange 134. As may be seen in Figs. 11 and 12 each bracket further includes an angle member 136 arranged in vertical position and tack-welded to the web to reinforce and rigidify the bracket. A pair of bolts 138 extends up through the bed 122 at each end thereof, having their heads counter-sunk in the steel plates 126, and through the lower horizontal flanges 132 of the brackets. Nuts 140 are threaded on the bolts and hold the brackets firmly on the bed.

An angle member 142 is secured to the web 130 and upper horizontal flange 134 of each bracket 128 by means such as welding and extends to the rear thereof. The horizontal flange of each angle member 142 is turned up as at 144, while the vertical flange is turned out as at 146 to form a continuation of the ear or flange 144. The ears or flanges 146 and 144 are recessed into the ends of a main rail 148 to which they are secured by means of screws 150. The main rail 148 is made of wood, as is conventional, and extends across all of the piano actions. The angle members 142 in supporting the main rail are analogous to the action brackets of a conventional piano, and hereinafter may sometimes be referred to as action brackets.

Extending laterally across the bed 122 and generally centrally thereof is a balance rail 152. A plurality of piano keys 154, some of the keys being white and some black as in conventional pianos, is pivotally supported on the balance rail. Balance key pins 156 on the balance rail extend up through the keys 154 as is conventional, and the top surface of the balance rail is inclined so as to support the keys in the inclined position shown in the drawings with the inner or front end thereof resting on a felt pad 158. It will be understood that felt pads or washers 160 surround the balance key pins in accordance with conventional practice. At the outer or front end of the bed 122 there is provided a front rail 162 carrying a plurality of front key pins 164 received in the underside of the keys. A wood strip 166 (Fig. 4) having a felt strip 168 on top of it extends from end to end across the front rail and serves as a limit stop for the keys when they are depressed. It will be apparent that in the action now being described the keys would pivot about the felt washers usually provided about the outermost of the front key pins with the keys rising from the balance rail if the strips 166 and 168 were not provided and the front ends of the keys were struck strongly.

Figure 8:
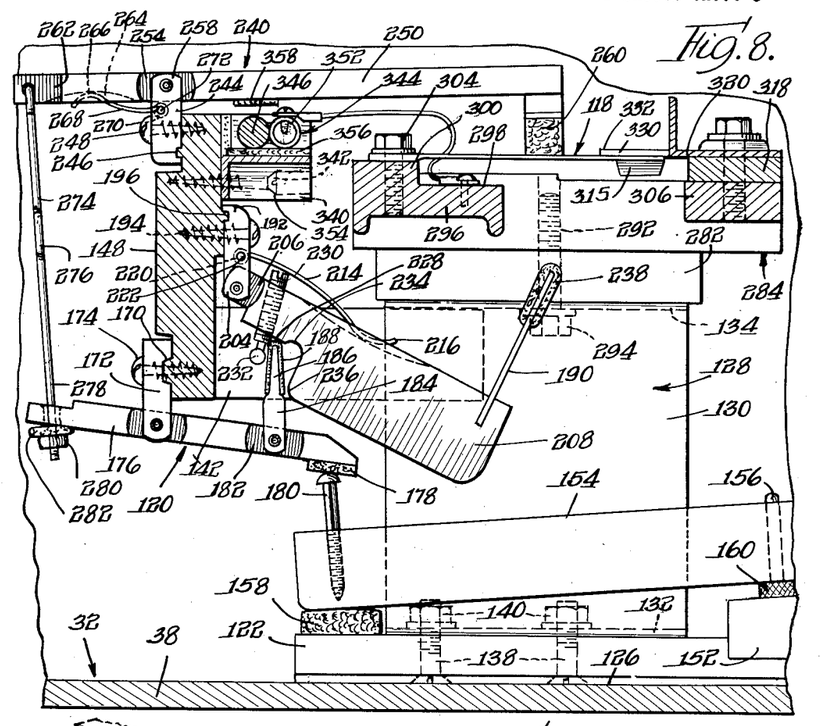
Fig. 8 is an enlarged vertical cross sectional view showing the piano action.
Figures 9, 10:
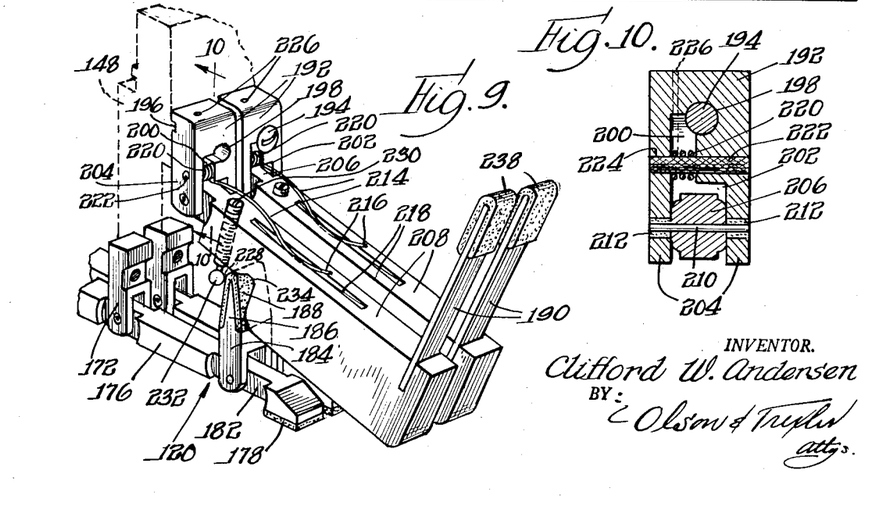
Fig. 9 is a perspective view showing two adjacent piano actions.
Fig. 10 is a vertical sectional view through a butt flange taken substantially along the line 10—10 in Fig. 9.

The lower rear corner of the main rail 148 is grooved to provide a ridge 170 as may be seen in Fig. 8. Along this lower rear corner of the main rail there is provided a plurality of whip flanges 172. The whip flanges are grooved to receive the ridge 170 and a screw 174 is passed through each whip flange and is screwed into the main rail to mount the whip flanges. A whip 176 is pivotally carried by each flange 172 as best may be seen in Figs. 8 and 9. Each whip is relieved on opposite surfaces to receive the legs of the whip flange. Each whip is provided beneath its outer end with a felt pad 178, and this felt pad rests on the rounded head of a capstan screw 180 threadedly received in a corresponding key 154. Each capstan screw is provided with a square shank for receiving a wrench to adjust the capstan screw up or down beneath the end of the whip.

Each whip 176 is relieved on opposite sides as at 182 near its forward end pivotally to receive a jack or fly 184. Each jack or fly, like the whip and whip flange, is made of wood. It is generally straight in configuration having a tapered end at 186 covered by a felt pad 188 engageable with a butt to lift the hammer 190 for striking one of the reeds 118 when a corresponding key 154 is depressed.

Each hammer is mounted by means of a butt flange 192. The construction of the butt flanges is shown best in Figs. 8–10. Each butt flange comprises a block of wood held against the front of the main rail by means of a screw 194. Each butt flange 192 is grooved on the back surface near the top thereof to receive a ridge 196 on the main rail positively to locate the butt flanges and to prevent the twisting of the butt flange about its mounting screw. Each butt flange is provided with a generally cylindrical aperture 198 for receiving the mounting screw 194, and this aperture communicates with a longitudinal recess 200 in the front face of the butt flange. The recess 200 communicates with an opening 202 through the butt flange providing a pair of depending legs 204. A recessed portion 206 of each butt 208 is received between the legs 204. A steel pin 210 extends transversely through the reduced portion 208 and is pivotally received in felt inserts 212 in the depending legs 204.

A butt spring 214 is provided for each butt 208 and has an extending end portion 216 thereof received in a kerf 218 in the upper surface of the butt. The intermediate portion of each butt spring is coiled into a helix as at 220, and a nylon cord 222 passed through aligned apertures 224 on opposite sides of the groove 200 pivotally receives the helical coil 220 of the spring. The opposite end of the spring extends upwardly through a vertical bore 226 opening into the groove or slot 200 and extending to the top of the butt flange.

Each butt 208 is provided adjacent its lower rear corner with a plane surface 228 against which the felt pad 188 on the corresponding jack or fly engages. A screw 230 is threaded downwardly through each butt at an acute angle relative to the plane surface 228 and provides with the plane surface 228 a corner in which the felt 188 on the jack or fly rests. Each screw 230 is provided at its lower end with a spherical tip 232 engageable with the side of a felt 188 to displace the jack or fly from the plane surface 228 as will be apparent hereinafter.

Immediately adjacent the plane surface there is a semicircular recess 234 connected by a downwardly extending surface to a rounded shoulder 236 at the bottom edge of the butt. The hammer 190 comprises a thin strip of wood inserted directly into the top edge of the butt, the butt being extended the necessary length to receive the hammer. The elimination of the usual shank eliminates a glued joint, thereby saving in manufacturing time and in maintenance problems. Furthermore, the longitudinally extended butt provides a greater mass in the vicinity of the hammer to insure the proper swinging operation of the hammer. The hammer is provided at its tip with a folded over piece of felt 238 for striking the reed 118 as will be appreciated.

Figures 11, 26:
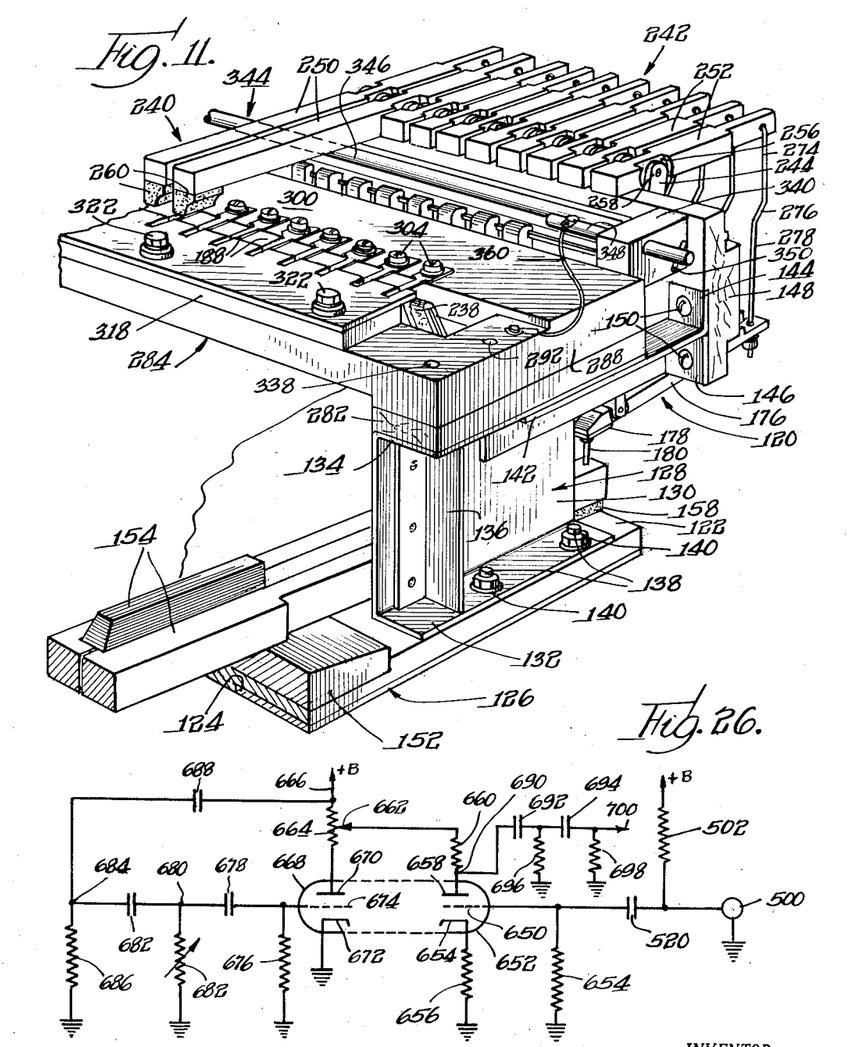
Fig. 11 is a fragmentary perspective view showing certain of the keys and associated tone generators.
Fig. 26 is a schematic wiring diagram of the tremulant which may be incorporated in the amplifier.
Figure 12:
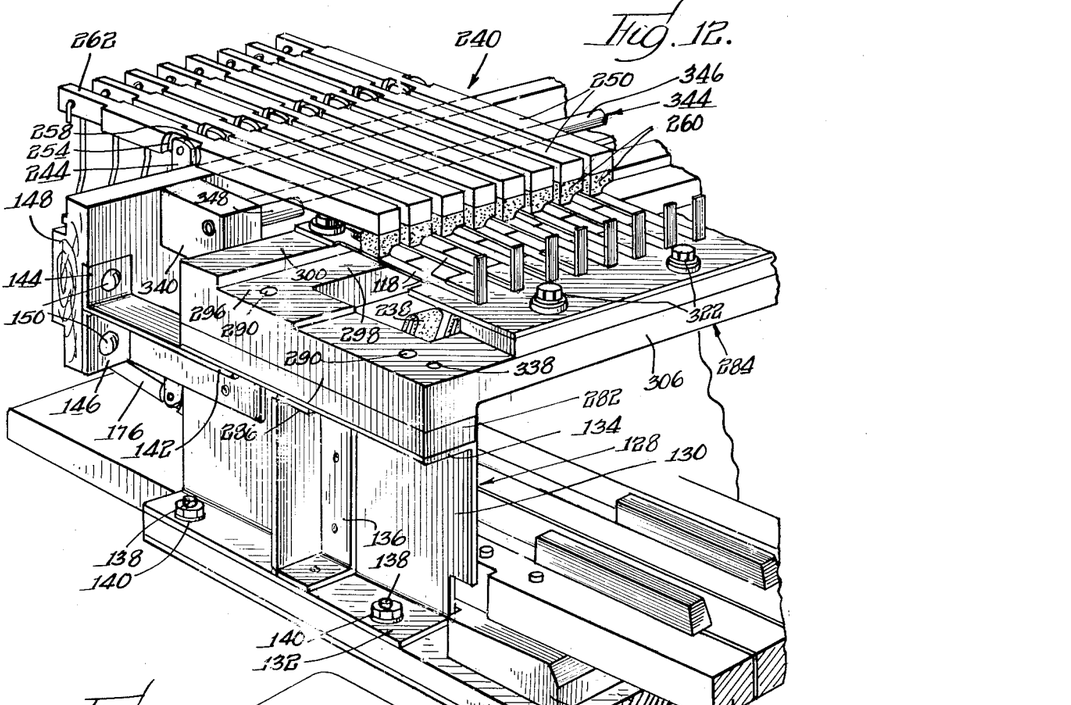
Fig. 12 is a perspective view similar to Fig. 11 and taken at the opposite end of the instrument.
Figure 13:
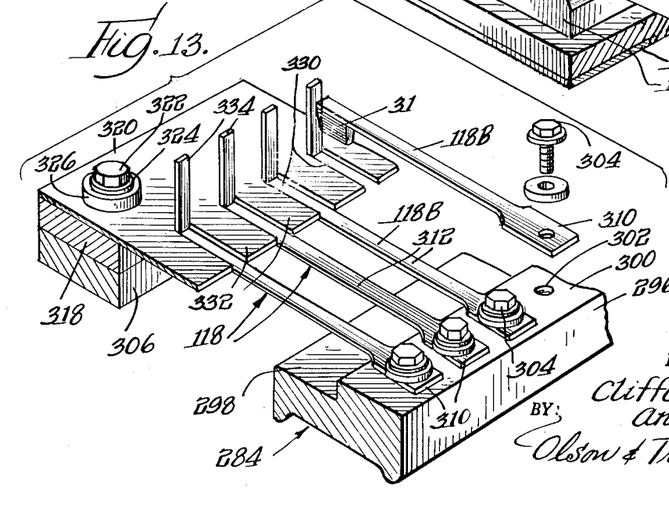
Fig. 13 is a detail perspective view showing certain of the reeds and the pick-up cooperable therewith.

All of the actions and reeds further are provided with damper mechanisms 240 except for the highest treble reeds which are provided with dummy damper mechanisms 242 (Fig. 11). A plurality of damper lever flanges 244 generally similar to the whip flanges and butt flanges is secured along the upper rear edge of the main rail, the main rail being recessed and provided with a ridge 246 received in the front faces of the damper lever flanges. A single word screw 248 extends through each damper lever flange 244 and into the main rail to hold the damper lever flange in mounted position. A damper lever 250 is provided for each flange 244 except for the upper treble range, and dummy damper levers 252 of shortened construction are provided for the flanges in this range. The damper levers and dummy damper levers both are made of wood and are recessed on opposite sides as at 254 and 256 respectively to fit between the upstanding legs 258 of the damper lever flanges. The outer ends of the damper levers are provided with felt pads for dampers 260 which bear against the associated reeds 118 to damp the same. The dummy damper levers are provided with pads (not shown) which bear against the top of the main rail to limit their movement in a counterclockwise direction as viewed in Fig. 8.

The rearwardly extending tail 262 of each damper lever 250 is of reduced width and is provided in its under surface with a slot 264 (Fig. 8) in which the end 266 of a damper lever spring 268 is seated. The spring 268 also includes a helically coiled portion 270 received around a pin 272 in the damper lever flange. This pin preferably is of nylon cord similar to the pin 222 in each butt flange, and the opposite end of the spring preferably extends down through a bore in the damper lever flange in a manner quite similar to the butt flanges. In fact, the butt flanges and damper lever flanges can be of substantially identical construction.

The upper end of a damper lever wire 274 is hooked through a transverse opening in the tail 262 of each damper lever 250 and of each dummy damper lever 252. The damper lever wires 274 are provided near their midsections with off-sets 276 whereby the lower portions 278 of the wires are aligned centrally with the tails 262. The lower portions 278 extend through openings in the rear ends of the whips 176 and are threaded for receipt for damper let-off buttons 280. Felt washers 282 are interposed between the damper let-off buttons and the whips.

Whenever the front or playing portion of a key is depressed, the key pivots about the balance rail and raises the capstan screw against the felt on the whip. This causes the whip to pivot in a counterclockwise direction as viewed in Fig. 8. The damper let-off button 280 initially is adjusted for a slight amount of lost motion, and after this lost motion is taken up the whip retracts the damper wire 276 and thereby pivots the associated damper lever 250 or dummy damper lever 252 about its mount to retract the damper from the associated reed so that the reed is free to vibrate. It will be understood that the treble reeds do not vibrate sufficiently long to require damping, but that the dummy damper levers are provided so that the touch of all of the keys in the piano will be uniform.

Furthermore, as the whip pivots it raises the jack or fly against the surface 228 whereby to pivot the butt. After the butt has pivoted a predetermined distance the spherical tip 232 of the regulating screw engages the jack or fly and moves it from beneath the surface 228, the butt and hammer then continuing upwardly solely by inertia. The butt then falls back so that the felt 188 on the jack or fly engages in the recess 234 and acts as a back check for the butt. When the key is released and the whip pivots back to its initial position the rounded shoulder 238 of the butt engages the felt 188 as the butt descends and pushes the fly or jack back to its initial position in the corner between the surface 228 and the regulating screw 230. It will be appreciated that adjustment of the regulating screw 230 determines when the jack or fly will be kicked from actuating position to back check position, and that the touch of the piano and the violence with which the hammer felt strikes the reed thereby can be adjusted by screwing the regulating screw up or down.

Figure 14:
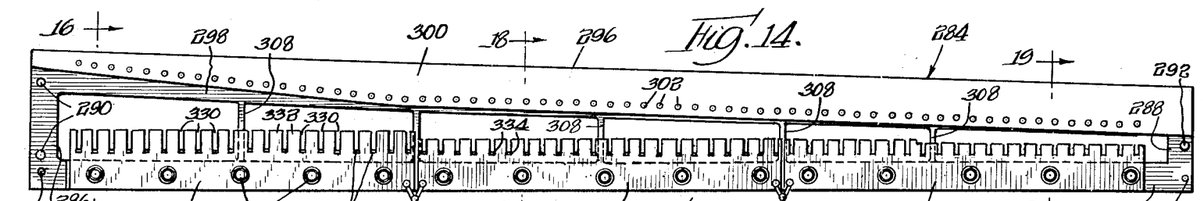
Fig. 14 is a plan view of the reed and pick-up supporting frame with the pick-ups in place thereon.
Figures 15, 16, 17, 18, 19:
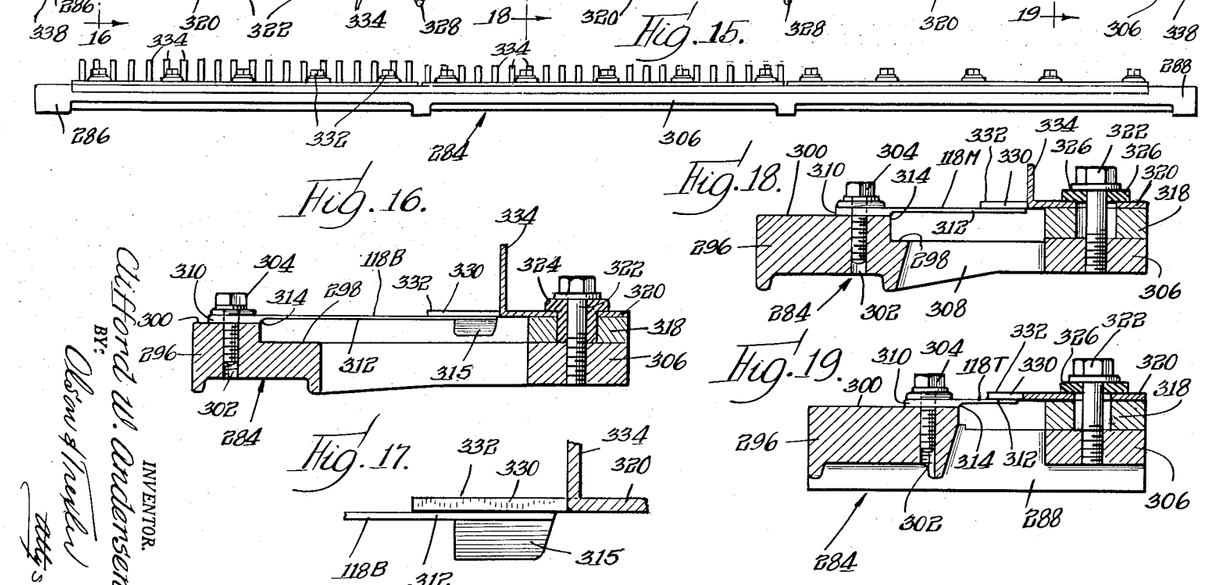
Fig. 15 is a side view of the parts shown in Fig. 14.
Fig. 16 is a cross sectional view taken along the line 16—16 of Fig. 14 with the reeds in place.
Fig. 17 is an enlarged side view partly in section of the end of the reed and the associated pick-up parts shown in Fig. 16.
Fig. 18 is a cross sectional view taken along the line 18—18 of Fig. 14 with the reeds in place.
Fig. 19 is a cross sectional view taken along the line 19—19 of Fig. 14 with the reeds in place.

A block of wood 282 (Figs. 8, 11 and 12) is placed on top of the upper horizontal flange 134 of each of the brackets 128. A cast iron reed and pick up supporting frame 284 of substantial mass is supported on top of the wood blocks 282. The frame is generally rectangular in outline as may be seen in Fig. 14, but tapers somewhat from a maximum width at the bass end to a minimum width at the treble end. The frame includes end members 286 and 288 at the bass and treble ends respectively. These end members rest on top of the wood blocks 282. The bass end member 286 is provided with threaded bores at 290 for receipt of mounting bolts (not shown) which extend up through the flange 134, the wood block 282, and into the end member 286. The treble end member 288 is provided with a single threaded bore 292. A bolt 294 (Fig. 8) extends up through the flange 134 and through the block 282, and is threaded into the bore 292 to hold the treble cross member 288 in mounted position. It will be understood that the wood blocks 282 provide a sufficiently resilient mounting to damp acoustical vibrations which might be transferred from the loudspeaker and case back to the frame and reeds to inhibit acoustical feed back, while at the same time mounting the frame with sufficient rigidity to broaden the resonance thereof and thereby to prevent deadening of certain tones.

The frame includes a rear or back bar 296 extending between the end members 286 and 288. The back bar includes a relatively shallow portion providing a shelf 298 and a raised reed supporting portion 300. The shelf 298 tapers from a maximum width at the bass end of the frame to a minimum in the treble range, disappearing completely at the upper end of the treble range. The raised reed supporting portion 300 correspondingly increases in width. A plurality of tapped bores 302 is spaced along the raised reed supporting portion 300 for receiving reed mounting bolts 304.

The supporting frame 284 further includes a front bar 306 of shallow construction relative to the rear bar and having its top surface spaced slightly above the shelf 298. The frame is completed by a plurality of strengthening ribs 308 extending between and integral with the front and rear bars.

The reeds 118 previously referred to are shown in detail in Figs. 13 and 16-19. The reeds in general are of similar construction, and the bass reeds are distinguished by the addition of the suffix B, while the reeds of the middle range are identified by the numeral 118M, and the treble reeds are identified by the numeral 118T. Each of the reeds includes a relatively thick butt or base 310 having an aperture therein for receiving the mounting bolt 304 threaded into the tapped aperture 302 in the back bar 296. Each reed also includes a vibratile tongue 312 extending from the base. The tongue joins the base at an undercut shoulder 314. The shoulder 314 insures vibration of the reed tongue from the shoulder on out, with no vibration of the base or butt. Accordingly, no critical clamping means for the reed is necessary to insure vibration of the proper part thereof.

It will be evident to those skilled in the art that the reeds of different tones necessarily will be of different sizes. More particularly, and as shown in the drawings, the bass reeds 118B must be larger than the reeds 118M of the middle register, and the treble reeds 118T must be still smaller than the reeds of the middle register. In addition, and in order to secure sufficient inertia for low frequency vibration rendering the bass reeds 118B unduly large, each bass reed is provided with a lead weight 316 (Figs. 13, 16 and 17) on the underside of its outer end. This lead weight can be added to or subtracted from for tuning a reed to the proper frequency. In general, it is simplest to make the lead weight slightly oversize at first and then to file part of the lead off in tuning the reed.

The frequency of vibration of a reed depends upon the stiffness or compliance of the reed, and also on the mass of the reed. Oxidation of a reed, as might occur with time, would affect both the mass and the compliance of the reed, and therefore could result in serious detuning. This is avoided in the present piano by providing a rust proof coating on the reeds. More specifically, the reeds are cleaned in a solvent, and then are rinsed. The reeds then are dipped in hot zinc phosphate. The reeds then are rinsed, and any remaining dip material is neutralized in an acid solution. The reeds then are dried. The result is a zinc phosphate coating on the reeds which positively prevents rusting or corroding thereof. An insulting bar 318 of Bakelite or other suitable material is placed on top of the front bar 306. A series of pick up bars or plates 320 is supported on top of this insulating bar. The pick up plates 320 and the insulating bar 318 are provided with aligned openings through which bolts 322 are passed and threaded into tapped openings in the front bar 306. Insulating bushings 324 (Fig. 16) are placed in the extreme openings of each pick up plate and the associated holes in the bar 318 and insulating washers 326 (Figs. 18 and 19) are placed beneath the heads of the remaining bolts 322, the bolts passing through the pick up plates 320 with sufficient clearance to avoid electrical contact therewith.

The plates 320 in the present instance are electrically connected to one another by jumpers as at 328 (Fig. 14), but the plates could be made integral. They are made in sections for convenience of manufacture, and also in order that different voltages could be applied to the different pick up plates if it were desired to treat different tones differently. As will be understood, there could be more than three pick up plates and the plates could be connected together as by the jumpers 328, or the plates could be connected to different amplifying channels.

Each of the pick up plates 320 is provided with a slot or notch 330 aligned with each reed. The pick up plates are positioned so that the bottoms thereof coincide with the tops of the reeds 118, and so that the reeds 118 project into the slots 330, the fingers 332 formed between the slots projecting along the side of a portion of the reed, but lying above the reed. The fingers 332 associated with the bass reeds are longer than those associated with the reeds in the middle register, while some of the treble reeds are shorter than those in the middle register. This variation in length is desirable because of the variation in length of the reeds themselves. The pick up plates 320 are formed of sheet aluminum. The slots 330 in the bass and middle register are formed by striking fingers or ears 334 upwardly from the surface of the plates. In the treble range the material is stamped completely from the plates and no fingers or ears are provided. A box-like shield 336 (Figs. 4 and 5) is placed over the pick up plates and the ends of the reeds and is secured to the frame 284 by means of bolts (not shown) threaded into apertures 338 (Figs. 11, 12 and 14) in the frame adjacent the front corners thereof.

The fingers 332 and the struck up ears or fingers 334 form pick up elements in cooperation with the reeds 118. Thus, a capacity exists between each reed and its associated pick up element, and this capacity varies upon vibration of the reed. Thus, when a direct current potential is applied across this capacity, an alternating current potential is developed which is proportional to the vibration of the reed. Accordingly, an oscillation is set up which is similar to the physical vibration of the reed and which can be amplified and converted into audio sound simulating a piano.

The bass reeds have a swing or magnitude of vibration which carries the reeds both above and below the surface of the associated pick up fingers. It will be understood that the capacity between a reed and the associated pick up fingers decreases each time the reed moves away from the fingers, i.e. two times per cycle of vibration of the reed. This causes an electrical oscillation twice the frequency of the reed. As a result, if only the fingers 332 were provided, there would be a very strong harmonic to the bass notes with a very weak fundamental. In fact, under such conditions it has been found that the fundamental may reach a peak as much as two seconds later than the second harmonic reaches its peak. This is not at all in accordance with a build up of tones in a piano, and the resulting sound has a distinct organ-like quality and does not simulate a piano with sufficient realism.

The fingers 334 extending upwardly from the plane of the pick up plate are sufficiently high that the reed never passes beyond them. Thus, capacity between the fingers or ears 334 and the associated reed decreases only during the downswing of the reed, and remains substantially constant during the upswing of the reed. As a result, the fingers or ears 334 cause a strong fundamental to be developed. The resulting tone has a proper balance of fundamental and second harmonic. The sounds produced from the loudspeaker of the electronic piano thus are remarkably realistic in piano tone.

It will be understood that the fingers 334 could be directed downwardly rather than upwardly, and that the reeds could be positioned with their bottom surfaces coplanar with the top surface of the pick up plates. The weights then would be placed on top of the reeds and would be more accessible for tuning.

The amplitude of vibration of the treble reeds is sufficiently small that the treble reeds do not pass above the top surfaces of the pick up plates. Thus the upturned ears or fingers are not necessary. The tone from the treble reeds, as from the strings of a conventional piano, is very nearly a pure sine wave, with only very weak or nonexistent harmonics in the audio range.

The physical structure of the piano is completed by the damper lift or damper release structure. This structure is seen best in Figs. 8, 11 and 12. The damper lift or release mechanism includes a pair of wood blocks 340 (Figs. 4, 8, 11 and 12) mounted on the front of the main rail 148 near the opposite end thereof and substantially on a level with the top surface thereof. Each damper lift or release block 340 is mounted on the main rail 148 by means of a single screw 342 passed through the block and into the main rail.

The blocks 340 pivotally support a damper lifter or release assembly 344. The damper release assembly includes a damper lifter or release bar 346 having pivot bars or rods 348 eccentrically contacting and welded to the lifter or release bar or rod 346. The two pivot bars or rods 348 are aligned with one another and are rotatably received in suitable apertures in the blocks 340. The holes through which the pivot bars or rods extend preferably are coated with graphite for permanent lubrication. The pivot bar or rod 348 at the right or treble end of the piano extends through the block 340 as may be seen in Fig. 11 and is provided with a radially extending cross pin 350. Intermediate the ends of the damper release or lifter bar or rod 346 is a short tube 352 (Fig. 8) coaxially welded or brazed with the pivot rods to the lifter bar or rod. An angle bracket 354 is positioned beneath the tube 352 and is provided on its upper surface with a felt pad 356 which contacts the tube 352 and the lifter or release bar or rod 346. It will be observed in Fig. 8 that a felt pad 358 is provided on each damper lever 250 immediately above the bar or rod 346. The damper lifter or release assembly is grounded to prevent capacitive effects by means of a flexible braided wire 360 (Fig. 11) extending from the right hand pivot rod 348 to the frame 284.

By virtue of the fact that the actions and the tone generating means are all supported solely on the base or bed 122, this entire structure can be inserted into the case as a unit during assembly, or can be removed from the case for repair or adjustment. The manner in which this assembly slides to and from the case is shown in Fig. 5. The assembly is held in the case by means of a plurality of screws extending up through the bottom 38 of the case and threaded into T-nuts in the base or bed 122, although it will be understood that other holding means could be utilized.

Figures 20, 21, 22, 23, 24:
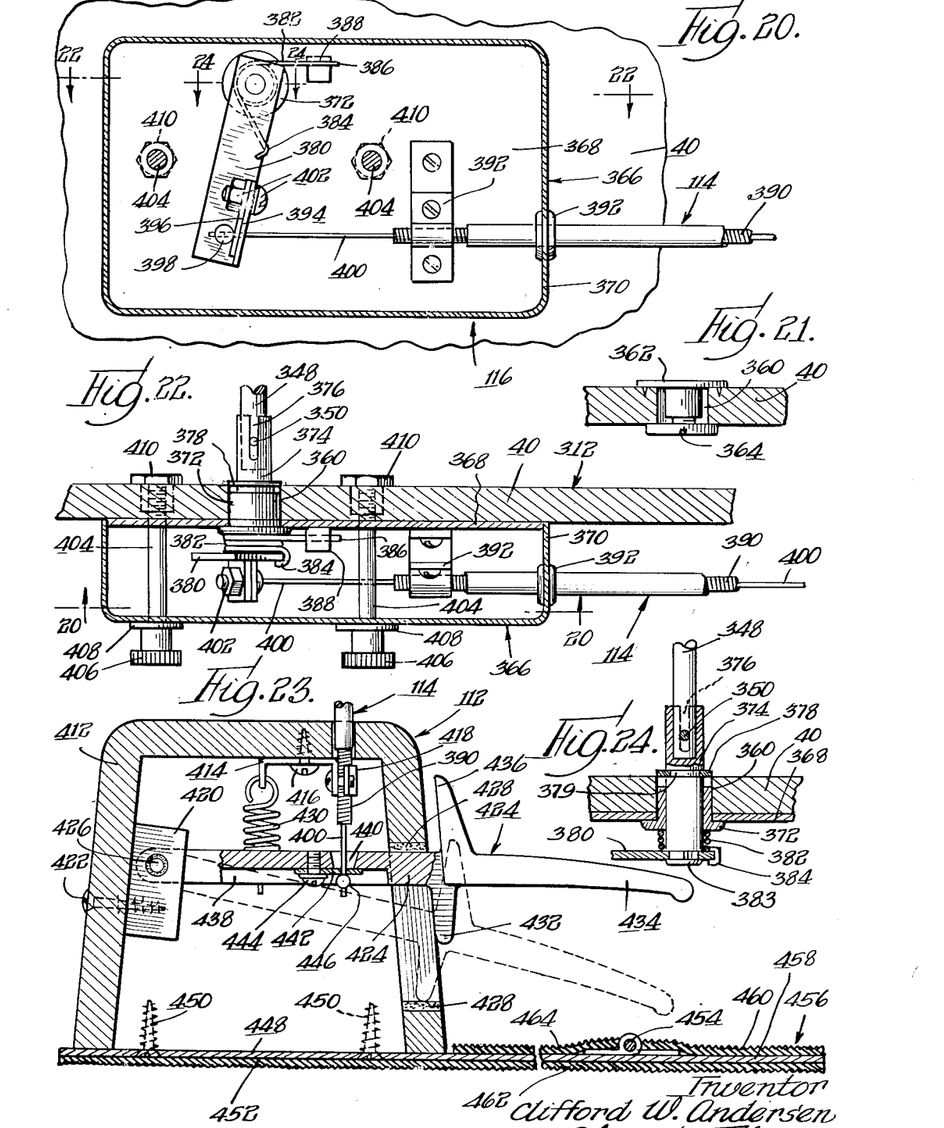
Fig. 20 is a side view of the mechanism attaching the pedal to the side of the case for actuating the damper release with the cover of the mechanism and the attaching bolts in section as taken substantially along the line 20—20 in Fig. 22.
Fig. 21 is a cross sectional view taken substantially along the line 24—24 in Fig. 20 showing the anchoring means and closure plug before installation of the pedal attachment.
Fig. 22 is a horizontal sectional view taken along the line 22—22 in Fig. 20.
Fig. 23 is a longitudinal sectional view through the pedal structure as taken substantially along the line 23—23 in Fig. 1.
Fig. 24 is a sectional view taken along the line 24—24 in Fig. 20.

The right hand extending pivot bar or rod 348 is aligned with an opening 360 (Figs. 21, 22 and 24) in the end wall 40 of the piano case 32. For initial shipment a T-nut 362 (Fig. 21) is placed inside the wall 40 extending into the hole 360 and a flat headed screw 364 is threaded into the T-nut to close off the opening. The opening may be left closed off in this manner indefinitely, but it will be impossible to play forte in this manner. For playing forte a pedal assembly must be connected to the pivot rod 348. This pedal assembly comprises the pedal unit 112, the Bowden cable 114 and the attaching unit 116 previously described and shown in detail in Figs. 20-24.

The attaching assembly 116 includes a sheet metal case 366 including a back or base 368 and a dished-out cover 370 secured thereto in any suitable manner. A bushing 372 is press fitted or otherwise firmly secured in an aperture in the back wall or base 368, and a split sleeve 374 having longitudinal slots 376 therein is journaled in this bushing. A retaining ring 378 is snapped into a groove 379 in the sleeve 374 to prevent retraction of the sleeve from the bushing. An arm or lever 380 is fixed on the opposite end of the sleeve by means such as a peened over portion 383, or by any other suitable means.

A spring 382 is coiled about the sleeve 374 between the arm 380 and the bushing 372 and has one end thereof hooked around the edge of the arm as at 384. The opposite end 386 of the spring bears against a tab 388 struck out from the back wall or base 368. The arm and sleeve thus are biased in a clockwise direction as viewed in Fig. 20.

The end of the helically coiled sheath 390 of the Bowden cable passes through a grommet 392 in the case wall 370 and is anchored by means of a suitable clip or fixture 392 to the base 368. The end of the control wire extends through an aperture in a flange 394 on the arm 380 and also through a cable stop 396 of conventional construction. A sphere or ball 398 is crimped or otherwise conventionally fastened on the end of the control wire 400, and the cable stop 396 is secured on the flange 394 by means such as a nut and bolt 402.

Two bolts 404 having knurled knobs 406 and circumferential flanges 408 thereon extend through the cover 370 and through the back wall or base 368 and are threaded into the wall 40 of the case 32 detachably to hold the attaching fixture on the wall. Preferably the ends of the bolts 404 are received in T-nuts 410, and flat head screws can be inserted in the T-nuts before the bolts 404 are applied to close off the holes. Alternatively, the T-nuts could be provided with solid flanges at their inner ends to prevent passage of dirt into the interior of the case. As will be observed in Figs 22 and 24 the split sleeve 374 projects through the hole 369 and encircles the pivot rod 348 with the cross pin 350 extending into the slot 376 of the sleeve. The bushing 372 also extends into the hole 360. The T-nut 362 may be removed from the hole before the sleeve is inserted, or the T-nut may be made of sufficiently great diameter to allow clearance of the bushing 372 and the retainer ring 378.

It will be understood that the connecting assembly 366 readily can be removed from the piano for transportation thereof by loosening the bolts 404.

The pedal assembly or structure 112 comprises a somewhat cup-shaped housing 412 of rectangular cross section and preferably cast of any suitable material such as aluminum, plastic or other material. A substantially U-shaped bracket 414 is secured on the underside of the top of the housing 412 by means such as one or more screws 416. The bracket 414 is provided with a clamp 418 securing the opposite end of the helically coiled wire 390 of the Bowden cable.

A pair of pedal hinge blocks 420 is secured on the inside of the rear wall of the housing 412 by means such as screws 422. A pedal 424 of cast metal is pivoted on a pin 426 extending between the blocks 420. The pedal is provided with a shank portion 424 extending through a vertical slot 426 in the opposite or front wall of the housing 412. The slot is provided at top and bottom with felt pads 428. The upper pad is engaged by the shank 424 which is urged upwardly by a coil spring 430 stretched between the bracket 414 and the shank, while a heel 432 extending downwardly from the shank engages the lower pad 424 when the pedal is depressed. A toe portion 434 extends outwardly from the shank 424 as a continuation thereof, and is engageable with the toe of the player to depress the pedal. An upstanding flange 436 between the shank and toe portion prevents the player's toe from rubbing against the housing.

The shank is provided on its undersurface with a recess 438, and a vertical opening through the shank 440 cooperates with this recess. A cable stop 442 is mounted within this recess by a screw 444, and a sphere or ball 446 is crimped or otherwise suitably secured on the end of the control member 400 of the cable for moving the control member when the pedal 424 is depressed.

A steel plate 448 is held on the bottom of the housing 412 by means such as screws 450, and a rubber pad 452 is mounted to the bottom of the steel plate. The lower surface of the rubber pad preferably is corrugated or otherwise formed to provide a relatively non-skid surface.

The end of the steel plate 448 is provided with a split hinge 454 similar to the split hinges holding the cover on the piano case. The other half of the split hinge is connected to a heel rest 456 comprising a steel plate 458 having rubber pads 460 and 462 on the top and bottom thereof. The outer surfaces of these rubber pads preferably are corrugated or otherwise shaped for non-skid purposes. A rubber pad 464 is secured on top of steel plate 448 externally of the housing similarly to the pad 460. The pianist's heel will rest on the heel rest 456 so that the pedal assembly will not tend to move away from him when the pedal 424 is operated.

It will be apparent that when the pedal 424 is depressed the control wire 400 will be retracted, and hence will rotate the lever arm 380 in a counterclockwise direction. This acts through the split sleeve 374 and pin 350 to rotate the pivot rod or bar 348. Consequently, the damper release or lifter rod or bar will be raised beneath the felt pads on the damper levers to lift all of the damper levers, thereby allowing the piano to be played forte. It will be understood that the tube welded or brazed to the side of the lifter or release rod or bar and bearing on the associated bracket prevents deflection of the center of the damper lifter or release rod or bar which would result in non-uniform lifting of the damper levers.

Figure 25:
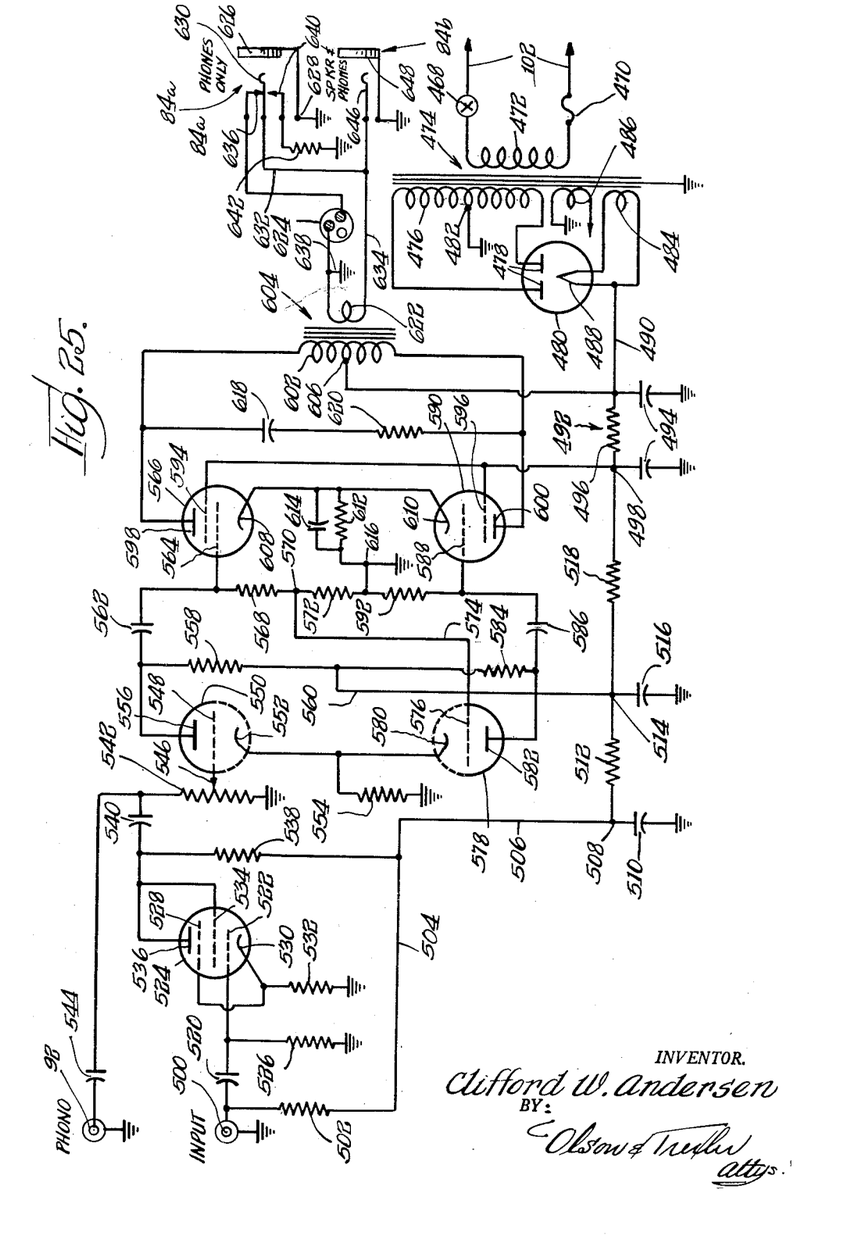
Fig. 25 is a schematic wiring diagram of the amplifier.

The amplifier utilized in the electronic piano now will be described with regard to the wiring diagram of Fig. 25. The flexible lead wires 102 previously referred to are connected through a switch 468 mounted on the back of the volume control and through a fuse 470 to the opposite ends of the primary winding 472 of a power transformer 474. The power transformer is provided with a high voltage winding 476 the opposite ends of which are connected to the plates 478 of a rectifier tube 480 of any suitable type, a 5Y3GT tube being recommended. The high voltage coil or winding 476 is provided with a grounded center tap 482. The transformer 474 also includes a filament winding 484 for the rectifier tube, and a filament winding 486 for the remaining tubes hereinafter to be described. The rectifier filament winding 484 is shown as connected directly to the filament-cathode 488, while the other filament winding 486 is shown as provided with an arrowhead, and it is to be understood that this arrowhead runs to one side of the filament of each remaining tube, the other side of each filament being grounded in accordance with conventional practice.

The cathode-filament 488 of the rectifier tube is connected by means of a wire 490 to a filter unit 492 comprising pi connected capacitors 494 and a resistor 496. A junction 498 at the output end of the pi filter 492 comprises a source of filtered B+.

The jack into which the input lead from the tone generators comprising the reed and pick ups is inserted is indicated at 500. This jack is connected through a resistor 502, a wire 504, and a wire 506 to a junction 508. The junction is grounded through a smoothing capacitor 510 and is connected through a resistor 512 to another junction 514. This junction in turn is connected through another smoothing capacitor 516 to ground, and through a resistor 518 to the B+ terminal 498. It is to be understood that all of the capacitors 494, 510 and 516 are power type capacitors of substantial capacity.

The circuit just described provides the necessary polarizing potential to the pick ups for the development of electrical oscillations by the varying capacities between reeds and pick ups.

The input jack 500 further is connected by means of a capacitor 520 of small value to the control grid 522 of an amplifier tube 524. By way of specific example, the amplifier tube 524 may be a type 6AU6. Similarly, and by way of illustration, the capacitor 520 may be on the order of .005 microfarad, although this value may be varied somewhat according to the desired tonal results.

Although the lowermost bass strings on a conventional piano are capable of producing tones very near the bottom of the audio range, the sounding boards of even the largest grand pianos resonate at somewhat under one hundred cycles per second, while the sounding board of a spinet type piano will more likely resonate on the order of two hundred cycles per second. As a result, the bass response of pianos drops off, and it drops more rapidly for a spinet type piano than it does for a grand piano. It is this drop in the bass due to different sounding board characteristics that gives rise to the distinguishing tones of a grand piano and of a spinet type piano. The small value of the capacitor 520, in conjunction with the grid resistance 526, cuts the bass response of the electronic piano herein disclosed so as to resemble a conventional piano rather than to resemble an organ, which would be the case if the bass response were not cut. The value of the capacitor 520 in large measure determines whether the electronic piano will simulate a spinet piano or a grand piano. The suggested value of .005 microfarad causes the instrument to simulate a spinet piano.

The suppressor grid 528 is directly connected to the cathode 530, and the cathode is grounded through a resistor 532. The screen grid 534 is directly connected to the plate 536, and the plate is connected through a load resistor 538 to the wire 506 in order to supply B+ potential to the plate.

The plate 536 also is connected through a coupling capacitor 540 to the top end of a volume control 542. The phonograph connecting jack 92 previously mentioned also is connected through a coupling capacitor 544 to the top of the volume control 542. The coupling capacitors 540 and 544 are of conventional size, and this may be on the order of .01 microfarad.

As is well known, the characteristics of the human ear are such that the bass notes are relatively discriminated against at low volumes. Although the bass may be properly balanced with the remainder of the scale at moderate or high volume levels, as is obtained in the present instrument by the capacitor 520, when the tones are produced at lower volume levels the bass will appear to be deficient. Accordingly, the volume control 542 is of the tone compensated type. Tone compensated volume controls are well known in the art, and the particular one utilized in a production model of this instrument is known commercially as a "Compentrol." The sliding tap 546 of the volume control 542 is directly connected to the grid 548 of a triode amplifier tube 550. The cathode 552 of this tube is grounded through a resistor 554. The plate 556 is connected through a load resistor 558 to a wire 560 leading to the junction 514 to provide B+ voltage to the tube 550.

The plate 556 further is connected through a coupling capacitor 562 to the control grid 564 of a power amplifier tube 566. The grid 564 and the capacitor 562 further are connected through a resistor 568 to a junction 570, and this junction is grounded through a resistor 572.

Junction 570 also is connected by means of a wire 574 to the control grid 576 of a triode amplifier tube 578. The amplifier tubes 550 and 578 conveniently are the two sections of a twin triode housed in a single envelope. This tube preferably is a 12AU7A. This tube is desirable for this use due to its non-microphonic characteristics. It will be understood that the filament of this tube is center tapped and therefore is connected in the present installation for six volt operation along with the remaining tubes in the amplifier.

The cathode 580 of the amplifier tube 578 is grounded through the aforementioned cathode resistor 554, and the plate 582 is connected through a plate load resistor 584 to the aforementioned wire 560 for supplying B+ voltage to the tube 578. The plate 582 further is connected through a coupling capacitor 586 to the control grid 588 of a power amplifier tube 590. The grid 588 and capacitor 586 further are connected through a resistor 592 to ground.

The tubes 550 and 578 serve as an amplifier and phase inverter. Thus, the resistor 568 has a value approximately ten times that of the resistor 572, while the sum of the values of the resistors 568 and 572 substantially equals the value of the resistor 592. By way of specific example, the resistor 568 may be 200,000 ohms, the resistor 572 may be 22,000 ohms, and the resistor 592 may be 220,000 ohms. Thus, the signal appearing at 570 will be in phase with the signal applied to the grid 564 of the power output tube 566. Although the two signals will be in phase, the signal at 570 will be only about one tenth as great as the signal on the grid 564. The signal at 570 is fed through the wire 574 to the tube 578, the phase of the signal being reversed, and the signal being amplified by about ten times. Thus, the signal appearing on the plate 582 and hence on the grid 588 is equal in amplitude to the signal appearing on the grid 564, but is 180° out of phase. Thus, the two tubes 566 and 590 are driven in push-pull. The two tubes in a specific embodiment of the invention comprise 6AQ5's.

The screen grids 594 and 596 of the tubes 566 and 590, respectively, are connected to the B+ terminal 498 for supplying filtered B+ potential to the screen grids. The plates 598 and 600, respectively, are connected to the opposite ends of the input winding 602 of an output transformer 604. The winding 602 is center tapped at 606, and the center tap is connected to the wire 490 for supplying relatively unfiltered B+ potential at high voltage to the plates of the tubes 598.

The cathodes 608 and 610 are connected together to a cathode circuit comprising a parallel connected resistor 612 and capacitor 614, this circuit being grounded at 616.

A capacitor 618 in series with a resistor 620 is connected across the plates of the power output tubes 566 and 590 for uniformly decreasing the trouble response of the amplifier in order properly to simulate a conventional piano. The inductance of the winding 602 and the capacitance of the capacitor 618 form a tuned circuit, and there is a possibility that this circuit might break into oscillation if excited sufficiently strongly. The resistor 620 serves to prevent any such oscillation.

The output winding 622 of the transformer 604 is connected to a speaker socket 624, and also to the two jacks 84 previously referred to. One of the jacks, hereinafter to be referred to by the numeral 84a, is for the operation of the piano with earphones only, while the second jack, hereinafter referred to as 84b, is for operation of the piano with both loudspeaker and earphones. In connection with the reference to earphones, it will be appreciated that a cable could be plugged in connecting an external loudspeaker and that a more powerful amplifier might be mounted exteriorly of the piano in conjunction with such a speaker.

The phone jack 84a is provided with a ring 626 through which the phone plug is inserted. This ring is grounded as at 628. A movable contact 630 is positioned for engagement by the plug, and this contact is connected by means of a wire 632 and a wire 634 to the winding 622. The contact 630 normally engages a fixed contact 636 which is connected to one contact of the speaker socket 624. A second contact of the speaker socket is grounded at 638 and is connected to the opposite end of the winding 622. When the movable contact 630 does so engage the fixed contact 636, a circuit is completed through the loudspeaker 94 and the flexible cable 98, the cable 98 having a plug received in the socket 624.

A second fixed contact 640 is provided on the opposite side of the movable contact 630 from the fixed contact 636, and this second fixed contact is grounded through a resistor 642. The resistor 642 is of substantially the same resistance as the loudspeaker 94, the loudspeaker 94 commonly being a 3.2 ohm speaker, and the resistor 642 being a 3 ohm resistor. When the earphone plug is inserted, the contact 630 is moved out of engagement with the fixed contact 636 and into engagement with the fixed contact 640. The circuit to the socket 644 and hence to the loudspeaker thus is broken. The resistor 642 is placed in circuit to present the same resistance to the output transformer 604. The earphones are connected in parallel with the resistor 642, being connected between the contact 630 and the ground 626. The impedance of the earphones will be understood as being sufficiently high that the parallel connection with the resistor 642 does not significantly change the total resistance.

The wire 634 also is connected to a contact 646 in the jack 84b, and the jack 84b further includes a grounded ring 648. Thus when the earphone plug is inserted in the jack 84b rather than in the jack 84a the earphones are connected in parallel with the socket 624 and hence the loudspeaker 94 by virtue of the contacts 646 and 648.

Part of the circuit just described can be replaced to provide a tremulant which results in output tones similar to those of a vibraharp rather than a piano. Such a modification of the circuit is illustrated in Fig. 26. The modification replaces the first amplifier tube 524 and certain of the parts associated therewith. More specifically, the input jack 500 is still connected through the resistor 502 to the B+ voltage supply, and the input signal is still connected through the low value capacitor 520. The capacitor 520 in Fig. 26 is connected to the control grid 650 of a triode amplifier tube 652, and also is connected through a grid resistor 654 to ground. The cathode 654 is grounded through a cathode resistor 656, and the plate 658 is connected through a load resistor 660 to the sliding tap 662 of a potentiometer 664. The upper end of the potentiometer is connected at 666 to B+ potential such as to the wire 506 in Fig. 25 where the resistor 538 was previously described as being connected. Plate power thus is provided for the tube 652.

Another triode amplifier tube 668 is provided and has its plate 670 directly connected to the lower end of the potentiometer or resistor 664. Preferably the two triodes 652 and 668 comprise the triode sections of a single 12AX7 tube. The cathode 672 of the tube 668 is grounded.

The control grid 674 is grounded through a grid resistor 676 and is connected to a capacitor 678. The capacitor 678 is connected to a junction 680 which is grounded through a variable resistor 682 forming a tremulant speed control as will hereinafter be described. The junction 680 also is connected through a capacitor 682 to a junction 684, the latter being grounded by a resistor 686 and connected through a capacitor 688 to the top of the resistor or potentiometer 664. The tube 668 and associated resistors and capacitors form an oscillator which oscillates in the vicinity of six cycles per second. The specific frequency is adjustable by means of the variable resistor or speed control 682. The speed control effects a change in frequency of only about two cycles per second, generally centered about a mean oscillation frequency of six cycles per second.

The sub-audio oscillation of the tube 668 causes an oscillating voltage drop across the resistor or potentiometer 664, and the voltage change across this resistor will be found to be in the neighborhood of 90 volts. A portion of this voltage is impressed on the plate 658 of the amplifier tube 652 through the resistor 660, and hence modulates the tone signal applied to the grid 650 from the input jack 500. The depth of intensity of modulation is determined by the setting of the slide tap 662.

The output of the tremulant circuit is taken from the plate 558 at 690 and is fed through a filter comprising capacitors 692 and 694, and resistors 696 and 698 to an output connection 700. This output connection 700 would be connected directly to the top of the compensated volume control 542. The last mentioned filter is for the purpose of eliminating the six cycle per second oscillations from the output of the tremulant.

A piano constructed as hereinbefore described possesses a great many novel and advantageous features. The piano action for percussively actuating the reeds is materially simplified from conventional piano actions and yet retains a desirable and positive action. The mounting of the hammer directly on the butt, eliminating the conventional shank, eliminates a glued joint, thereby simplifying production and leading to longevity. Furthermore, the extended butt imparts desirable inertia characteristics to the butt and hammer structure insuring a proper movement of the hammer into engagement with the reed. The hammer let-off is easily adjusted by screwing the regulating screw in or out of the butt, and the touch is easily adjusted by threading the capstan screw in or out of the key. The specific pivotal mounting of the damper insures a smooth and trouble free damper operation, and this operation is furthered by the specific damper release structure. The pad at the front edge of the front rail prevents the keys from pivoting and lifting from the balance rail if they are struck with a hard blow near the outer ends. The elimination of the conventional back check mechanism and its assumption by the fly or jack in cooperation with the butt leads to a simpler construction than heretofore has been thought possible.

The struck up fingers from the sheet metal pick up plates attain a proper balance of fundamental and harmonic properly to simulate the tones of a conventional string piano, and yet maintain production costs much lower than would be possible if the pick ups had to be cast or machined.

The molded plywood construction of the case provides a case which is economical to produce, and yet which is rugged and free from joints that might at some time loosen up or cause noises. The particular design of the case and also of the piano actions allows the piano actions readily to be moved in and out of the case without interfering with the remaining parts of the piano. This is of substantial value both in initial assembly of the piano, and in subsequent repair or adjustment. The removability of the cover also is important in this respect in providing better access to the interior of the case. The initial assembly and later repair or adjustment also is greatly facilitated by the construction of the various parts as separate units with no wiring or other interconnections except for the plug-in connection of the tone generators to the amplifier and of the amplifier to the speaker. The piano also preferably is provided with a pilot light that has not been shown or described. Such a pilot light preferably is detachably carried in a bracket on or near the music desk and readily can be slipped from the bracket when the piano actions are removed from the case.

The elimination of the rubber or other resilient mounting for the reed supports as heretofore used and the clamping down of the reed and pick up supporting frame lowers the "Q" of the frame and consequently broadens the resonance thereof substantially. This prevents deadening of any tones of the various reeds such as might be possible when the frame would tend to resonate at the frequency of one or more reeds.

The rust proof treatment of the reeds prevents oxidation thereof. It will be understood that this is of substantial value in that oxidation or other corrosion of the reeds would change their mass and also their compliance, thereby leading to detuning with age. Such detuning is avoided with the treating process herein outlined.

The pedal structure is simple in construction and rugged in operation, and allows the piano to be played forte. It does not in any way detract from the portability of the piano inasmuch as it readily can be attached to and removed from the piano. The heel plate on the pedal structure insures against movement of the pedal structure away from the pianist when in use, and the split hinge connection of the heel plate to the remainder of the pedal structure allows the pedal structure to be reduced to very small size for transportation.

The extremely small input capacitor in the amplifier cuts the bass response so that the audio tones emanating from the piano properly simulate a conventional stringed piano. Organ tones are prevented by this means, and beat notes or sub-tones are eliminated. Such beat notes or sub-tones would cause a muddy and indistinct bass. Furthermore, it will be understood that if the input capacitor were of substantial size, the variation in capacity caused by the vibrating reeds would be relatively small, and hence the amplitude of the oscillations would be small. The provision of a small input capacitor effects relatively large oscillation amplitude which eliminates the necessity of extreme amplification which could cause a considerable noise in the output of the piano. Furthermore, the small input capacitor cuts down the voltage of the bass reeds which tends to be too high due to the rather large swing or amplitude of vibration of the brass reeds.

The capacitor connected across the output of the amplifier helps to shape the treble response properly, while the resistor connected in series with the capacitor just mentioned prevents oscillation of this capacitor with the inductance of the output transformer. The specific phase inverter herein shown and described is of simple and reliable construction. As has been noted, a vibraharp quality of output can be obtained by incorporation of the electronic tremulant.

Various structural changes will no doubt occur to those skilled in the art, and are to be understood as forming a part of my invention insofar as they fall within the spirit and scope of the appended claims.

The invention is claimed as follows:

1. An electronic musical instrument comprising a common reed support, a plurality of reeds with bases fixed on said common support and with vibratile tongues projecting in the same direction therefrom in side-by-side substantially coplanar parallelism from said support, a plurality of hammers respectively percussively engageable with the tongues of said reeds respectively to set said reed tongues in decadent free vibration, a plurality of manually engageable keys respectively operatively connected to said hammers for selectively moving said hammers into such percussive engagement with said reed tongues, a sheet metal pickup member of flat uniform thickness comb-like configuration having a plurality of parallel teeth and an intermediate plurality of slots each opening at one end, means mounting said pickup member in opposition to said reeds substantially in a common plane therewith with the reeds projecting into the slots between the teeth, the teeth on opposite sides of a reed extending substantially the same distance therealong, there being at least one reed tongue in each slot, and each reed being closely adjacent a pickup tooth along a longitudinal edge of said reed, said pickup teeth terminating at free ends short of the reed bases, the hammers respectively percussively engaging the reed tongues between the reed bases and the free ends of the adjacent pickup teeth, said reeds and said pickup member comprising electrostatic tone generating means, means establishing an electrical potential between said reeds and said pickup member, electric oscillations being generated in accordance with the change in capacity between said reeds and said pickup member resulting from free decadent vibration of said reeds relative to said pickup member, electronic amplifying means connected to said reeds and said pickup member for amplifying the oscillations generated by the decadent free vibration of said reed tongues, and electro-acoustic translating means connected to said amplifying means for converting the amplified oscillations into audible tones.

2. An electronic musical instrument as set forth in claim 1 wherein for the full gamut of the musical instrument there is provided a plurality of pickup members, at least one of said members being of a different dimension in the direction of the reeds than at least one other of said members, and means electrically interconnecting said members.

3. An electronic musical instrument as set forth in claim 1 and further including a plurality of tabs integrally connected to said pickup member and projecting therefrom substantially normally, said tabs being struck from the sheet metal of the pickup member and leaving said slots.

4. An electronic musical instrument comprising a common reed support, a plurality of reeds with bases fixed on said common support and with vibratile tongues projecting in the same direction therefrom in side-by-side substantially coplanar parallelism from said support, a plurality of hammers respectively percussively engageable with the tongues of said reeds respectively to set said reed tongues in decadent free vibration, a plurality of manually engageable keys respectively operatively connected to said hammers for selectively moving said hammers into such percussive engagement with said reed tongues, a plurality of pickup members of comb-like configuration having a plurality of parallel teeth and an intermediate plurality of slots each opening at one end, each pickup member having a plurality of fingers of the same length, means mounting said pickup members in opposition to said reeds substantially in a common plane therewith with the reeds projecting into the slots between the teeth, the teeth on opposite sides of a reed extending substantially the same distance therealong, there being at least one reed tongue in each slot, and each reed being closely adjacent a pickup tooth along a longitudinal edge of said reed, said pickup teeth terminating at free ends short of the reed bases, the hammers respectively percussively engaging the reed tongues between the reed bases and the free ends of the adjacent pickup teeth, said reeds and said pickup members comprising electrostatic tone generating means, means establishing an electric potential between said reeds and said pickup members, electric oscillations being generated in accordance with the change in capacity between said reeds and said pickup members resulting from free decadent vibration of said reeds relative to said pickup members, electronic amplifying means connected to said reeds and said pickup members for amplifying the oscillations generated by the decadent free vibration of said reed tongues, and electro-acoustic translating means connected to said amplifying means for converting the amplified oscillations into audible tones.

5. An electronic musical instrument as set forth in claim 4 wherein all of the fingers of at least one pickup member are of the same length, and wherein the common reed support approaches the pickup member progressing from bass to treble.

6. An electronic musical instrument comprising a common reed support, a plurality of reeds with bases fixed on said common support and with vibratile tongues projecting in the same direction therefrom in side-by-side substantially coplanar parallelism from said support, a plurality of hammers respectively percussively engageable with the tongues of said reeds respectively to set said reed tongues in decadent free vibration, a plurality of manually engageable keys respectively operatively connected to said hammers for selectively moving said hammers into such percussive engagement with said reed tongues, a plurality of sheet metal pickup members of flat uniform thickness comb-like configuration having a plurality of parallel teeth and an intermediate plurality of slots each opening at one end, each pickup member having a plurality of fingers of the same length, all of the fingers of at least one member being of uniform length, means mounting said pickup members in opposition to said reeds substantially in a common plane therewith with the reeds projecting into the slots between the teeth, said common reed support approaching said pickup members progressing from bass to treble, the teeth on opposite sides of a reed extending substantially the same distance therealong, there being at least one reed tongue in each slot, and each reed being closely adjacent a pickup tooth along a longitudinal edge of said reed, said pickup teeth terminating at free ends short of the reed bases, the hammers respectively percussively engaging the reed tongues between the reed bases and the free ends of the adjacent pickup teeth, said reeds and said pickup members comprising electrostatic tone generating means, means establishing an electrical potential between said reeds and said pickup members, electric oscillations being generated in accordance with the change in capacity between said reeds and said pickup members resulting from free decadent vibration of said reeds relative to said pickup members, electronic amplifying means connected to said reeds and said pickup members for amplifying the oscillations generated by the decadent free vibration of said reed tongues, and electroacoustic translating means connected to said amplifying means for converting the amplified oscillations into audible tones.

References Cited in the file of this patent

UNITED STATES PATENTS

| | | |
|---|---|---|
| 1,906,250 | Devol | May 2, 1933 |
| 1,915,861 | Jacobs | June 27, 1933 |
| 1,950,859 | Midgley | Mar. 13, 1934 |
| 1,988,564 | Nernst | Jan. 22, 1935 |
| 1,992,317 | Loar | Feb. 26, 1935 |
| 2,001,391 | Miessner | May 14, 1935 |
| 2,008,120 | Almdale | July 16, 1935 |
| 2,251,546 | Neuber | Aug. 5, 1941 |
| 2,273,975 | Miessner | Feb. 24, 1942 |
| 2,284,911 | Maas | June 2, 1942 |
| 2,305,575 | Koehl | Dec. 15, 1942 |
| 2,318,936 | Fisher | May 11, 1943 |
| 2,368,842 | Kealoha | Feb. 6, 1945 |
| 2,384,805 | Arens | Sept. 18, 1945 |
| 2,530,251 | Luberoff | Nov. 14, 1950 |
| 2,535,503 | Miessner | Dec. 26, 1950 |
| 2,557,769 | Schmidt | June 19, 1951 |
| 2,655,069 | Marshall | Oct. 13, 1953 |
| 2,656,755 | Miessner | Oct. 27, 1953 |
| 2,715,850 | Murdock | Aug. 23, 1955 |
| 2,722,154 | Neumark | Nov. 1, 1955 |

FOREIGN PATENTS

| | | |
|---|---|---|
| 140,814 | Australia | Apr. 16, 1951 |